United States Patent [19]

Thiele et al.

[11] Patent Number: 4,883,175

[45] Date of Patent: Nov. 28, 1989

[54] SUSPENSION DEVICE FOR A CONTAINER

[75] Inventors: Hartmut Thiele, Munich; Heinz Mauser, Gilching, both of Fed. Rep. of Germany

[73] Assignee: Agfa-Gevaert Aktiengesellschaft, Leverkusen, Fed. Rep. of Germany

[21] Appl. No.: 155,564

[22] Filed: Feb. 12, 1988

[30] Foreign Application Priority Data

Feb. 24, 1987 [DE] Fed. Rep. of Germany ....... 8702812

[51] Int. Cl.$^4$ .......................................... B65D 85/00
[52] U.S. Cl. .................................. 206/387; 206/806; 215/101; 222/181; 248/691
[58] Field of Search ............... 206/309, 387, 806; 215/100 R, 101; 248/359, 368; 222/180, 181

[56] References Cited

U.S. PATENT DOCUMENTS

| | | | |
|---|---|---|---|
| 3,627,177 | 12/1971 | Marcus | 222/181 |
| 3,768,684 | 10/1973 | Buchtel | 222/181 |
| 3,935,956 | 2/1976 | Sansanelli | 215/100 R |
| 4,140,212 | 2/1979 | Somers | 206/387 |
| 4,177,896 | 12/1979 | Weavers et al. | 206/806 |
| 4,219,118 | 8/1980 | Somers | 206/387 |
| 4,241,859 | 12/1980 | Eames | 206/387 |
| 4,327,952 | 5/1982 | Cournoyer et al. | 206/387 |
| 4,333,568 | 6/1982 | Weldin | 206/806 |
| 4,527,762 | 7/1985 | Duell | 248/360 |

Primary Examiner—David T. Fidei
Attorney, Agent, or Firm—Connolly & Hutz

[57] ABSTRACT

An easy-to-handle suspension device for a container, which is suitable preferably for putting magnetic tape cassettes into archives, is characterized in that at least at one lateral front wall (3) adjacent to the front face wall (4) a hinged bracket is injected, whose free end is bent in a U-shape and whose length is calculated so that when hinged in it does not project beyond the rim (11,11') of the base and lid parts (1,2) and wherein the U-shaped bent part of the bracket when hinged in sits in a recess (13) of the face wall (4) and wherein the bracket when hinged out may be tilted by upto 90° to the face wall (3) and wherein a bar (9) or a rail of U-shaped profile or a hooking rail bent away at an obtuse angle can be used (FIG. 1).

6 Claims, 4 Drawing Sheets

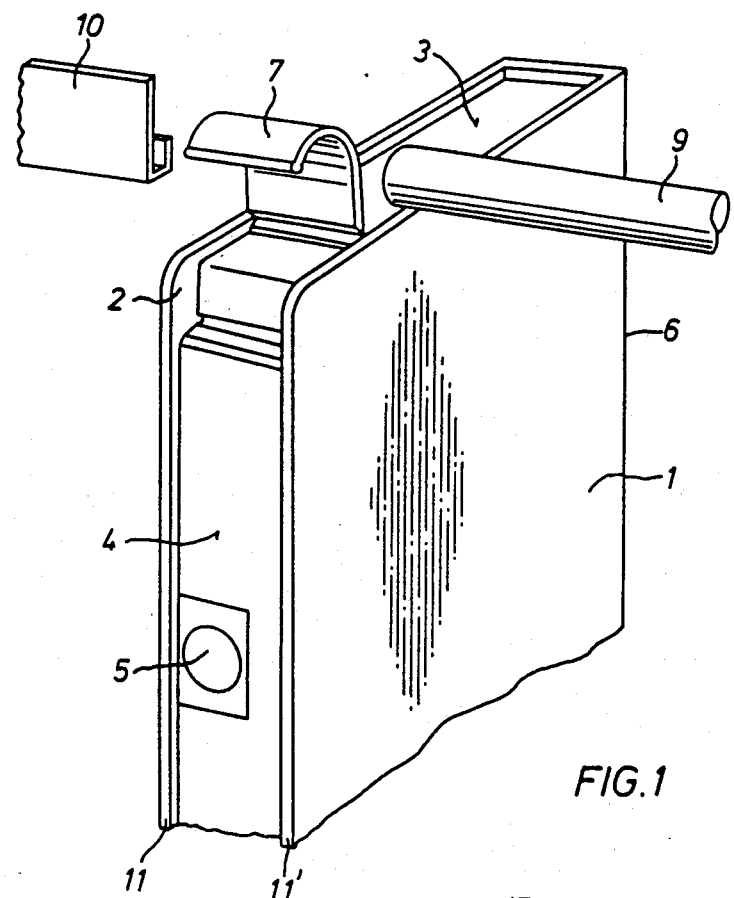
FIG.1
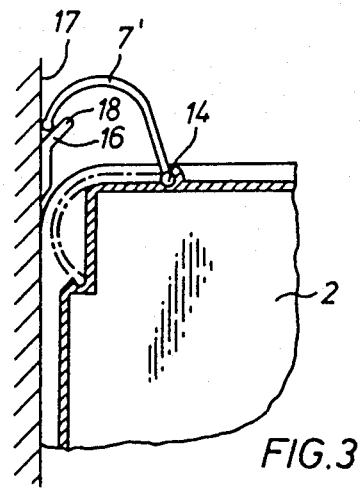
FIG.2
FIG.3

SUSPENSION DEVICE FOR A CONTAINER

The innovation relates to a suspension device for containers, which contain a wound picture or sound recording carrier, more particularly, a suspension device for an essentially rectangular container consisting of base and lid parts with circulating rims, front walls lying in between, and rear part, for a wound tape-shaped picture and sound recording carrier.

BACKGROUND OF THE INVENTION

Such a device is known from the U.S. Pat. No. 4,177,896, wherein an extrusion-blown double-walled container is described, one of whose face walls comprises a recess which is provided as a hooking element for a rail of L-shaped profile fixed to a wall. The free end of the rail thickens upwards. A flip-up U-shaped handle is attached to the back-side of the container lying opposite the suspension device for secure gripping and picking up or taking down of the container. This container is expensive to construct and does not offer sufficient convenience of gripping and placing in archives. A further disadvantage is that the container does not satisfy the standard measurements for video cassette containers that have emerged in the last few years.

Containers of this kind are described for example in DE-OS 29 13 812, 33 35 558, 35 02 536, the EP O 177 415, the U.S. Pat. Nos. 3,876,071, 4,011,940, 4,363,403, 4,365,711 and the U.S. Pat. Des. No. 262,414. They are generally book-shaped and consist of a base part and a lid part with a rim on the front and side walls and are connected via a rear wall by means of groove-shaped hinges, which are of lower strength compared with the construction parts otherwised used. The containers, called "Hardbox", may contain the VHS, Beta or U-matic video cassettes known to every person skilled in the art.

For putting these cassettes into archives, for example in broadcasting and television institutions, there is an urgent need for a simple and secure handling of the containers containing these cassettes, especially where these are present in large quantities.

For this reason the object consisted in finding a suspension device for the aforementioned containers, which is easy to handle and allows the inexpensive manufacture of the containers.

The object was solved according to the innovation by a suspension device with the characteristic given in the characterising part of the claims.

Closer details of the innovation emerge from the description and the drawings. In the following the innovation will be explained in greater detail by means of the diagrams in which:

BRIEF DESCRIPTION OF THE DRAWINGS

FIG. 1 shows a perspective partial view of an embodiment of the suspension device according to the innovation and two forms of embodiment of wall-side hooking elements, FIG. 2 shows a cross-section of the suspension device according to FIG. 1

FIG. 3 shows a cross-section of a different embodiment and a wall-side attachment

DESCRIPTION OF THE PREFERRED EMBODIMENTS

Figure 3A:
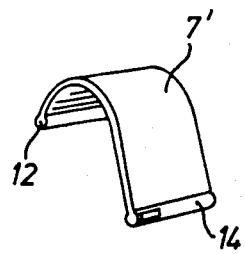
FIG. 3a shows a perspective view of a hooking element according to FIG. 3

A container, which contains the suspension device according to the innovation, possesses according to FIG. 1 a base (1) and a lid part (2) with a rim at the front and sidewalls (11,11') the facewalls (3,4) lying inbetween and the back part (6). A bolt (5) for unbolting and opening the container is provided in the front facewall (4). The container can be one-piece injection moulded out of polypropylene.

According to the innovation a bracket (7) is injected at the face wall (3) between the front face wall (4) and rear part (6) in the region of the generally rounded-off edge connecting both face walls. This bracket is bent at its open end in the shape of a U and is hinged at the place of injection (8) (FIG. 2). In the flipped-up state (FIG. 1) of the bracket (7) the container can be suspended either from a bar (9), which may for example be round in profile, or from a rail (10) of U-shaped profile. These suspension devices (9,10) are attached to a wall, a frame or similar in customary fashion. The length of the bent bracket (7) is calculated not to project beyond the rim (11,11') of the base or lid part in its flipped-down state (FIG. 2). A step-shaped recess (13) is therein present in the upper part of the face wall. The free end of the bracket may comprise a rib (12), which snaps into an undercutting of the recess (13).

Figure 3B:
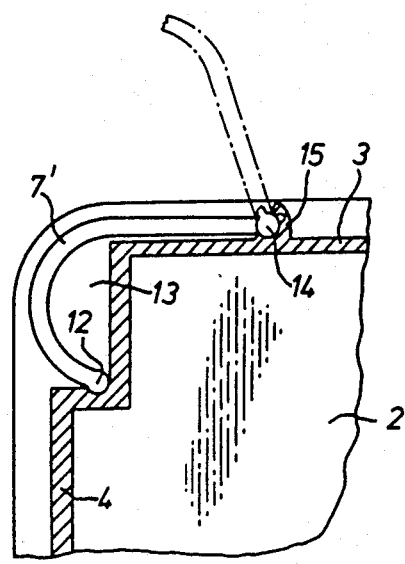
FIG. 3b shows an enlarged partial view of FIG. 3
Figure 7:
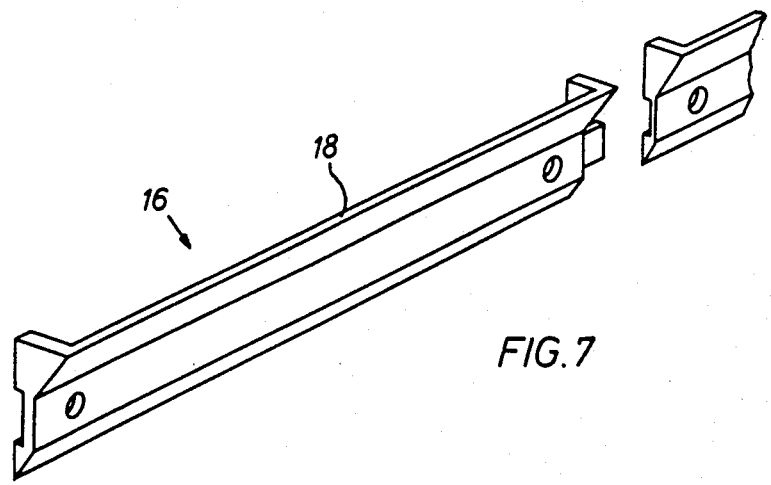
FIGS. 7–8 show perspective views of wall-side attachment elements for the suspension devices according to the innovation.
Figure 8:
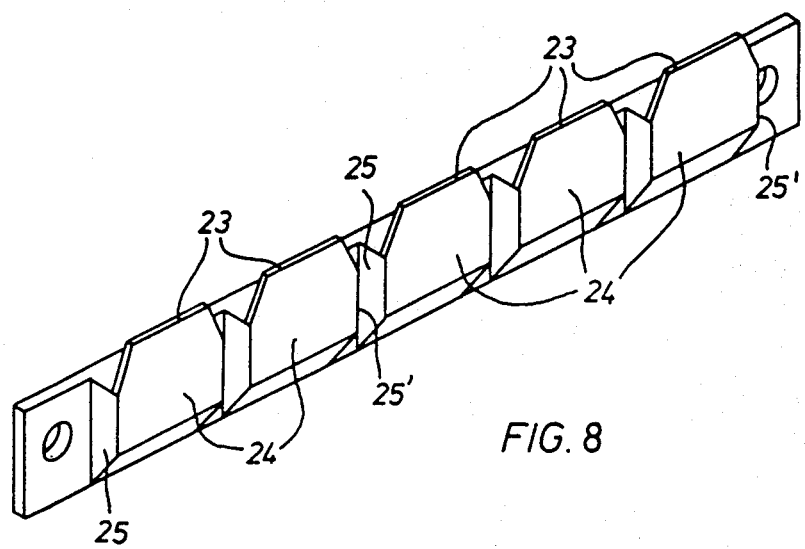

In another embodiment the bracket (7') (FIG. 3, 3a) is a separate part, which is inserted with the axle of rotation (14) into a hollow (15) of the face wall (3) with the container in its open state. The axle of rotation and hollow may contain pegs or grooves that are assigned to each other in such a manner that the bracket has a locking position in its flipped-up state (FIG. 3, 3b). The bracket is therein suspended from an affixing device (16), which is affixed to a wall (17) and whose upper free end (18) points at an acute angle away from the wall (FIG. 7). Other affixing devices, for example according to FIG. 8 are of course also conceivable. The bracket (7') consists preferably of an impact and flection-resistant synthetic material, for example macrolon.

Figure 5:
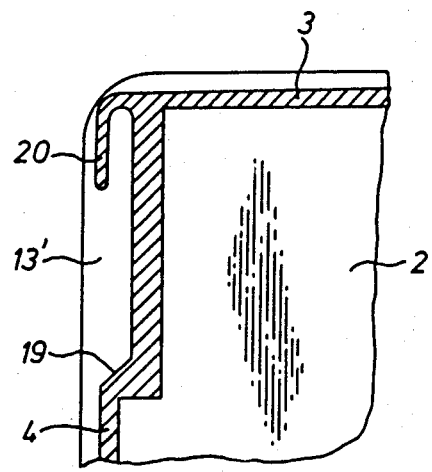
Figure 6:
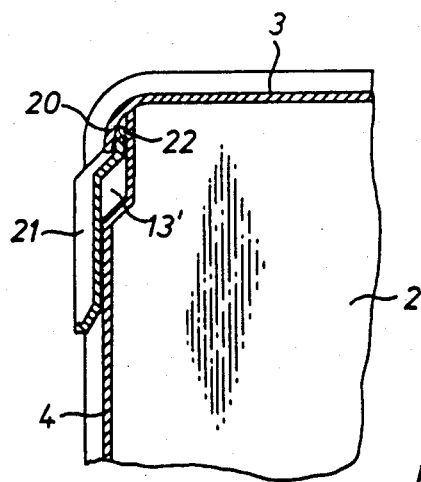

FIG. 5 shows a further embodiment of the suspension device according to the innovation. The front face wall (4) is therein interrupted in the region of the upper edge and replaced by a recess (13') with a slanting step (19), so that the upper part of the face wall (4) joining the edge forms a projecting spur (20) pointing downwards, that serves as a hooking element. A similar embodiment is shown in FIG. 6. The rail (21), bent repeatedly at an obtuse angle, may therein be used as a wall-side affixing element, whose lower part lies against the face wall (4) and whose upper free end (22) penetrates the recess (13') and grasps the spur (20) from behind. Another particularly preferred affixing element for the suspension devices represented in FIGS. 5 and 6 is the rail represented in FIG. 8, which possesses bay-like projections (23), against whose front surfaces (24) the face wall (4) of the container lies in the region of the recess (13') and whose lateral surfaces (25,25') lie against the projecting rims (11,11') of the container, so that each container is suspended without sliding from a projection (23).

Figure 4:
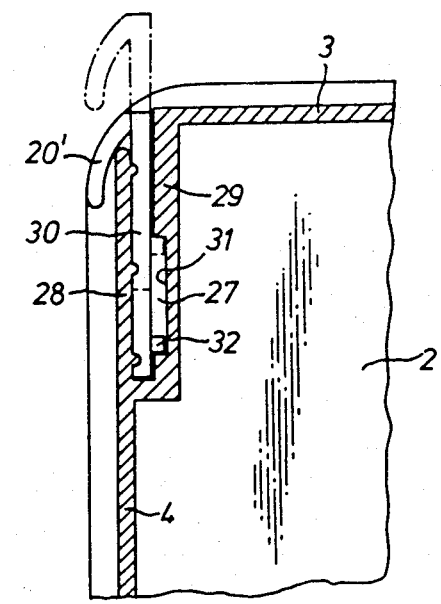
FIGS. 4–6 show cross-sections through further embodiments of the suspension device according to the innovation

Finally, FIG. 4 shows a further embodiment of the suspension device according to the innovation. Here too a spur (20') pointing downwards is present in the region of the edge, which, however, is not connected in one piece with a face wall of the container. Rather, the upper part of the facewall (4) is double-walled and a sliding rail (30) in the inner space (27) between the exterior side (28) and the interior side (29) is connected in one piece with the spur (20'). Various locking positions for the suspension device result from matching bumps and grooves formed on the inside of the exterior side (28) and on the side of the rail (30) adjacent thereto. The sliding region of the suspension device is therein limited by a recess (31) on the inside of the interior side (29) and a spur (32) on the side of the rail adjacent to the interior side, which engages with the recess. The suspension device described may be inserted when the container is open.

The suspension devices according to the innovation described above allow extraordinarily simple and comfortable handling during archiving and are in addition simple to manufacture and are, further, robust in use and combinable with a large number of wall-side affixing devices.

We claim:

1. A rectangular case for audio and video recording tape consisting of a base, lid and means for receiving recording tape, and having in combination,
   two major side walls,
   a face wall extending around three sides of said rectangular case and positioned between said walls so as to separate the side walls by the lateral dimension of the face wall,
   said face wall consisting of two end sections separated by a front face wall section,
   a rim on each of said side walls extending around the three sides of the case adjacent to the face wall, said rims extending beyond said face wall,
   a recess provided in said face wall by said extending rims,
   a hinged bracket with a hooked free end pivotally mounted on one of said face wall end sections for movement between an open position so that said hooked free end is engageable to provide support for the case, and a closed position in which the hinged bracket is retained within the recess,
   said bracket extending the full lateral dimension of the face wall from rim to rim.

2. In a rectangular box as claimed in claim 1, a rib on the free end of the bracket engageable in the recess.

3. In combination with the rectangular box as claimed in claim 1, a fixed rail of U-shaped profile engaging said free end of the bracket to support the box.

4. In combination with the rectangular box as claimed in claim 1, a fixed rail bent at an obtuse angle engaging said free end of said bracket to support the box.

5. In the box as claimed in claim 1 an axle of rotation in said hinged bracket, a hollow in the end section supporting the bracket and a peg and groove combination at the axle of rotation providing means for locking the bracket in open position.

6. A box according to claim 1, characterised in that the bracker (7') consists of a shock- and deflection-resistant synthetic material.

* * * * *